United States Patent
Okubo et al.

(10) Patent No.: US 9,636,987 B2
(45) Date of Patent: May 2, 2017

(54) HYBRID VEHICLE

(71) Applicant: HONDA MOTOR CO., LTD., Minato-Ku, Tokyo (JP)

(72) Inventors: Shinichi Okubo, Wako (JP); Kumiko Ohya, Wako (JP); Satoshi Igaue, Wako (JP); Hiroyuki Takeo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/767,045

(22) PCT Filed: Dec. 16, 2013

(86) PCT No.: PCT/JP2013/083608
§ 371 (c)(1),
(2) Date: Aug. 11, 2015

(87) PCT Pub. No.: WO2014/125722
PCT Pub. Date: Aug. 21, 2014

(65) Prior Publication Data
US 2015/0375610 A1 Dec. 31, 2015

(30) Foreign Application Priority Data

Feb. 13, 2013 (JP) .................................. 2013-025639

(51) Int. Cl.
*B60W 20/00* (2016.01)
*B60W 10/113* (2012.01)
(Continued)

(52) U.S. Cl.
CPC ................ *B60K 6/36* (2013.01); *B60K 6/365* (2013.01); *B60K 6/387* (2013.01); *B60K 6/48* (2013.01);
(Continued)

(58) Field of Classification Search
CPC ............ B60K 6/547; B60K 6/54; B60K 6/36
See application file for complete search history.

(56) References Cited

U.S. PATENT DOCUMENTS 6,176,808 B1 * 1/2001 Brown ................... B60K 6/365
180/65.25
6,811,508 B2 * 11/2004 Tumback ............... B60K 6/445
475/5
(Continued)

FOREIGN PATENT DOCUMENTS

CN 102348567 A 2/2012
JP 2009-036354 A 2/2009
(Continued)

OTHER PUBLICATIONS

Official Communication dated Oct. 26, 2016 in the corresponding Chinese Application No. 201380072126.3.

*Primary Examiner* — J. Allen Shriver, II
*Assistant Examiner* — Travis Coolman
(74) *Attorney, Agent, or Firm* — Carrier Blackman & Associates, P.C.; Joseph P. Carrier; William D. Blackman

(57) ABSTRACT

A hybrid vehicle is provided in which in the neutral range or the parking range, power can be generated in a first power generation mode by engaging an odd-numbered position clutch so as to transmit a driving force of an engine to a motor/generator via a first input shaft, and power can be generated in a second power generation mode by engaging an even-numbered position clutch so as to transmit the driving force of the engine to the motor/generator via reversing means and the first input shaft. Therefore, according to the status of the odd-numbered position clutch and the even-numbered position clutch, by engaging either one thereof, it becomes possible to generate power in the first
(Continued)

power generation mode or the second power generation mode, thus enabling power to be supplied without interruption.

2 Claims, 10 Drawing Sheets

(51) Int. Cl.
    *B60W 10/10*     (2012.01)
    *B60W 10/11*     (2012.01)
    *B60K 6/36*     (2007.10)
    *B60K 6/365*     (2007.10)
    *B60K 6/387*     (2007.10)
    *B60K 6/48*     (2007.10)
    *B60K 6/547*     (2007.10)
    *B60L 11/14*     (2006.01)
    *B60W 10/02*     (2006.01)
    *B60W 10/08*     (2006.01)
    *F16H 3/093*     (2006.01)
    *B60W 30/18*     (2012.01)
    *B60W 20/13*     (2016.01)

(52) U.S. Cl.
    CPC .............. *B60K 6/547* (2013.01); *B60L 11/14* (2013.01); *B60W 10/02* (2013.01); *B60W 10/08* (2013.01); *B60W 20/00* (2013.01); *B60W 20/13* (2016.01); *B60W 30/18054* (2013.01); *F16H 3/093* (2013.01); *F16H 2200/0047* (2013.01); *Y02T 10/6221* (2013.01); *Y10S 903/902* (2013.01)

(56) References Cited

U.S. PATENT DOCUMENTS

| | | | |
|---|---|---|---|
| 6,953,417 B2 | 10/2005 | Koenig | |
| 8,066,090 B2* | 11/2011 | Shimizu | B60K 6/445 180/305 |
| 8,241,166 B2* | 8/2012 | Sung | B60K 6/40 475/280 |
| 8,387,476 B2* | 3/2013 | Buchanan | F16D 23/06 74/335 |
| 8,597,149 B2* | 12/2013 | Potter | F16H 37/046 475/219 |
| 8,622,862 B2 | 1/2014 | Koyama et al. | |
| 8,795,115 B2* | 8/2014 | Puiu | B60K 6/365 475/207 |
| 8,900,080 B2* | 12/2014 | Kawasaki | B60K 6/48 475/210 |
| 9,008,881 B2* | 4/2015 | Kim | B60W 10/02 180/65.265 |
| 9,026,327 B2* | 5/2015 | Kaminsky | F16H 61/0213 477/97 |
| 2010/0125020 A1 | 5/2010 | Ikegami et al. | |
| 2010/0273594 A1* | 10/2010 | Sung | B60K 6/40 475/5 |
| 2012/0028749 A1* | 2/2012 | Kawasaki | B60K 6/48 475/211 |
| 2013/0210567 A1* | 8/2013 | Puiu | B60K 6/365 475/5 |
| 2013/0296135 A1* | 11/2013 | Kaminsky | F16H 61/0213 477/115 |
| 2014/0103761 A1* | 4/2014 | Atkins | B60K 6/105 310/74 |
| 2014/0163791 A1* | 6/2014 | Kim | B60W 10/02 701/22 |
| 2015/0031504 A1* | 1/2015 | Reynolds | B60W 10/02 477/93 |
| 2015/0045181 A1* | 2/2015 | Kawasaki | B60K 6/48 477/5 |

FOREIGN PATENT DOCUMENTS

| | | |
|---|---|---|
| JP | 2011088548 A | 5/2011 |
| JP | 2011-152914 A | 8/2011 |
| JP | 4837329 B2 | 12/2011 |
| WO | 2010/110343 A1 | 9/2010 |

* cited by examiner

FIRST POWER GENERATION MODE

FIG.6

| SHIFT POSITION | | CLUTCH | | ENGAGEMENT ELEMENT | | | | | |
|---|---|---|---|---|---|---|---|---|---|
| | | ODD-NUMBERED POSITION | EVEN-NUMBERED POSITION | LOW | 2ND | 3RD | 4TH | 5TH | RVS |
| | LOW | ● | ○ | ● | ○ | ○ | ○ | ○ | ○ |
| | 2ND | ○ | ● | ○ | ● | ○ | ○ | ○ | ○ |
| | 3RD | ● | ○ | ○ | ○ | ● | ○ | ○ | ○ |
| | 4TH | ○ | ● | ○ | ○ | ○ | ● | ○ | ○ |
| | 5TH | ● | ○ | ○ | ○ | ○ | ○ | ● | ○ |
| | RVS | ○ | ● | ● | ○ | ○ | ○ | ○ | ● |
| | FIRST POWER GENERATION MODE | ● | ○ | ○ | ○ | ○ | ○ | ○ | (●) |
| | SECOND POWER GENERATION MODE | ○ | ● | ○ | ○ | ○ | ○ | ○ | ● |

● : ENGAGED
○ : DISENGAGED

HYBRID VEHICLE

TECHNICAL FIELD

The present invention relates to a hybrid vehicle that includes a so-called twin clutch type transmission, which selectively distributes a driving force of an engine between first and second input shafts via first and second clutches.

BACKGROUND ART

An arrangement in which, when a twin clutch type transmission is in a neutral range, in a state in which a first clutch that is engaged when establishing an odd-numbered gear position and a second clutch that is engaged when establishing an even-numbered gear position and a reverse gear position are both disengaged, pre-shifting is carried out in advance so as to establish a first speed gear position and a reverse gear position, when shifting from the neutral range to a drive range is carried out the first clutch is engaged so as to make a vehicle start moving forward, and when shifting from the neutral range to a reverse range is carried out the second clutch is engaged so as to make the vehicle start moving in reverse, thereby enhancing starting responsiveness, is known from Patent Document 1 below.

RELATED ART DOCUMENTS

Patent Documents

Patent Document 1: Japanese Patent No. 4837329

SUMMARY OF THE INVENTION

Problems to be Solved by the Invention

Consideration could be given to making a vehicle hybrid by equipping it with such a twin clutch type transmission and connecting a motor/generator to a first input shaft to which the driving force of an engine is transmitted as a result of engagement of an odd-numbered position clutch, so that the driving force of the engine would be assisted by the driving force of the motor/generator when establishing an odd-numbered gear position or power would be generated by regenerative braking of the motor/generator.

In such a hybrid vehicle, when the vehicle stops in the neutral range or the parking range, the odd-numbered position clutch is engaged and the driving force of the engine is transmitted to the motor/generator via the first input shaft, thus enabling the motor/generator to be driven as a generator so as to generate power. However, when it becomes impossible to engage the odd-numbered position clutch due to a failure, etc., the driving force of the engine cannot be transmitted to the motor/generator, and there is a possibility that power generation will become impossible.

The present invention has been accomplished in light of the above circumstances, and it is an object thereof to provide a hybrid vehicle that enables a motor/generator to generate power in a non-travel range regardless of the status of a clutch of a transmission.

Means for Solving the Problems

In order to attain the above object, according to a first aspect, there is provided a hybrid vehicle comprising an engine, a first input shaft to which a driving force of the engine is transmitted via a first clutch, a motor/generator that is connected to the first input shaft, a second input shaft that is disposed in parallel to the first input shaft and to which the driving force of the engine is transmitted via a second clutch, an output shaft that is disposed in parallel to the first input shaft, a first power transmission path that transmits rotation of the first input shaft to the output shaft via a first gear group and a first engagement element, a second power transmission path that transmits rotation of the second input shaft to the output shaft via a second gear group and a second engagement element, reversing means that reverses rotation of the engine and transmits the rotation to the first input shaft, a third power transmission path that transmits rotation of the engine to the output shaft via the reversing means and the first power transmission path, the hybrid vehicle establishing a forward gear position in a drive range through the first power transmission path or the second power transmission path and establishing a reverse gear position in a reverse range through the third power transmission path, wherein in a neutral range or a parking range, it is possible to switch between a first power generation mode in which the first clutch is engaged so as to transmit the driving force of the engine to the motor/generator and generate power and a second power generation mode in which the second clutch is engaged so as to transmit the driving force of the engine to the motor/generator via the reversing means and generate power.

Further, according to a second aspect of the present invention, in addition to the first aspect, when the first clutch fails, power is generated in the second power generation mode.

It should be noted here that an odd-numbered position clutch Co of an embodiment corresponds to the first clutch of the present invention, an even-numbered position clutch Ce of the embodiment corresponds to the second clutch of the present invention, a first speed-third speed-reverse drive gear 20 and a fifth speed drive gear 21 of the embodiment correspond to the first gear group of the present invention, a second speed drive gear 23 and a fourth speed drive gear 24 of the embodiment correspond to the second gear group of the present invention, a first speed-second speed-third speed driven gear 26 and a fourth speed-fifth speed driven gear 27 of the embodiment correspond to the first gear group and the second gear group of the present invention, a third speed-fifth speed synchronizing device 22 and a first speed dog clutch 37 of the embodiment correspond to the first engagement element of the present invention, and a second speed-fourth speed synchronizing device 25 of the embodiment corresponds to the second engagement element of the present invention.

Effects of the Invention

In accordance with the first aspect of the present invention, the first clutch is engaged so as to transmit the driving force of the engine to the first input shaft, rotation of the first input shaft is transmitted to the output shaft via the first power transmission path, and a plurality of odd-numbered gear positions can thus be established. Furthermore, the second clutch is engaged so as to transmit the driving force of the engine to the second input shaft, rotation of the second input shaft is transmitted to the output shaft via the second power transmission path, and a plurality of even-numbered gear positions can thus be established. Moreover, the second clutch is engaged so as to transmit in reverse the driving force of the engine to the output shaft via the third power transmission path, which is formed from the reversing means and the first power transmission path, and the reverse gear position can thus be established.

In the neutral range or the parking range, power can be generated in the first power generation mode by engaging the first clutch so as to transmit the driving force of the engine to the motor/generator via the first input shaft, and power can be generated in the second power generation mode by engaging the second clutch so as to transmit the driving force of the engine to the motor/generator via the reversing means and the first input shaft. Therefore, according to the status of the first and second clutches, by engaging either one thereof it becomes possible to generate power in the first power generation mode or the second power generation mode, thus enabling power to be supplied without interruption.

Furthermore, in accordance with the second aspect of the present invention, since power is generated in the second power generation mode when the first clutch fails, it is possible to continue power generation without problems in the second power generation mode even if the first clutch malfunctions.

BRIEF DESCRIPTION OF DRAWINGS

FIG. 6 is an engagement table of engagement elements of the transmission. (first embodiment)

EXPLANATION OF REFERENCE NUMERALS AND SYMBOLS

Co Odd-numbered position clutch (first clutch)
Ce Even-numbered position clutch (second clutch)
E Engine
MG Motor/generator
12 First input shaft
14 Second input shaft
15 Output shaft
20 First speed-third speed-reverse drive gear (first gear group)
21 Fifth speed drive gear (first gear group)
22 Third speed-fifth speed synchronizing device (first engagement element)
23 Second speed drive gear (second gear group)
24 Fourth speed drive gear (second gear group)
25 Second speed-fourth speed synchronizing device (second engagement element)
26 First speed-second speed-third speed driven gear (first gear group, second gear group)
27 Fourth speed-fifth speed driven gear (first gear group, second gear group)
37 First speed dog clutch (first engagement element)
45 Reversing means

MODES FOR CARRYING OUT THE INVENTION

A mode for carrying out the present invention is explained below by reference to FIG. 1 to FIG. 10.

First Embodiment

Figure 1:
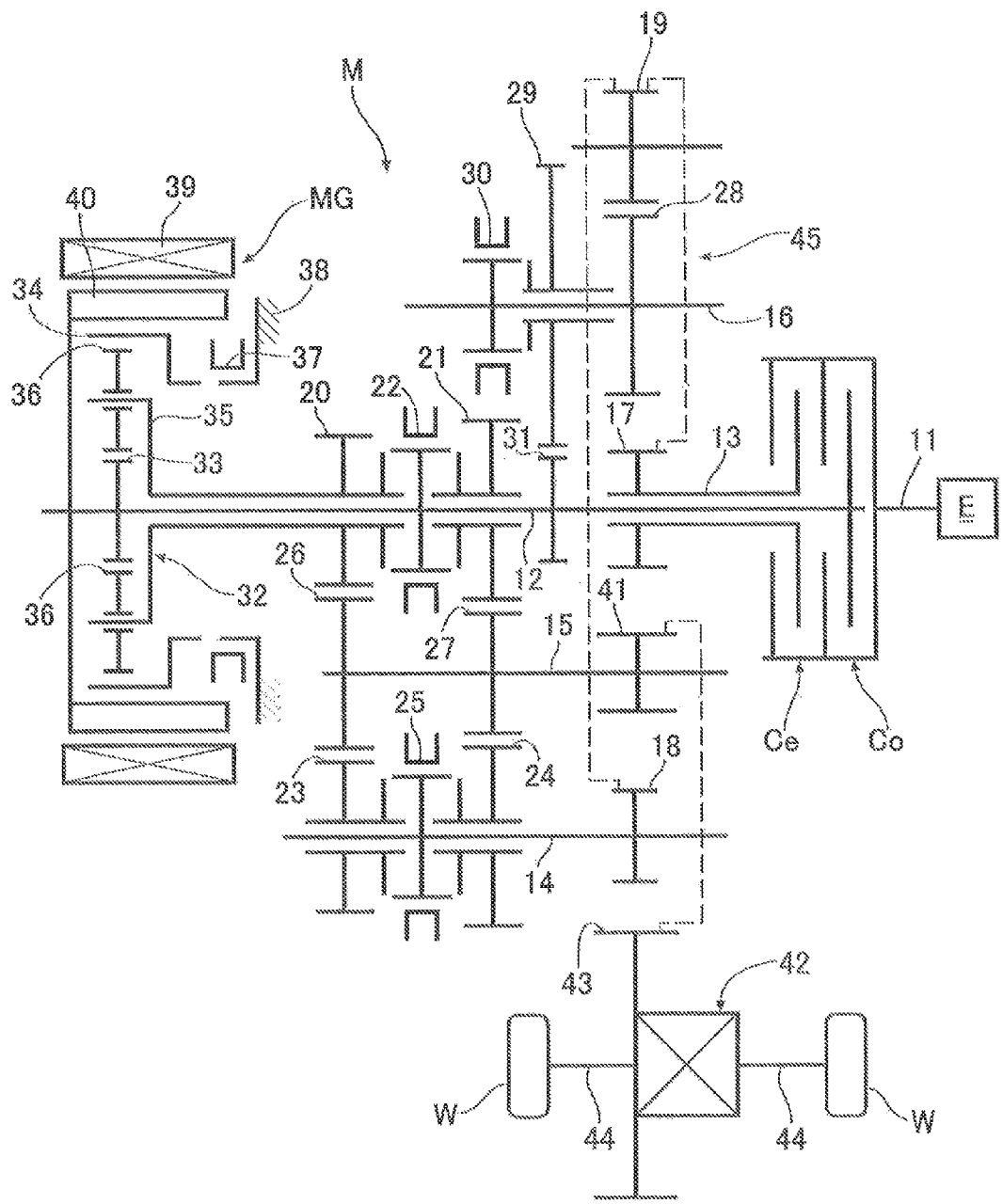
FIG. 1 is a skeleton diagram of a transmission of a hybrid vehicle. (first embodiment)

As shown in FIG. 1, a twin clutch type transmission M for a hybrid vehicle having five forward speeds and one reverse speed includes a drive shaft 11 coaxially connected to a crankshaft of an engine E, a first input shaft 12 disposed coaxially with the drive shaft 11, a sleeve-shaped outer shaft 13 surrounding the outer periphery of the first input shaft 12, and a second input shaft 14, an output shaft 15, and an idle shaft 16 that are disposed in parallel to the first input shaft 12. An odd-numbered position clutch Co and an even-numbered position clutch Ce, which are dry single plate clutches and are disposed in tandem, are connected to the drive shaft 11; when the odd-numbered position clutch Co is engaged the drive shaft 11 is joined to the first input shaft 12, and when the even-numbered position clutch Ce is engaged the drive shaft 11 is joined to the outer shaft 13.

Fixedly provided on the outer shaft 13 is a first input shaft gear 17, and fixedly provided on the second input shaft 14 is a second input shaft gear 18, the first input shaft gear 17 and the second input shaft gear 18 being always linked via an idle gear 19.

Relatively rotatably supported on the first input shaft 12 are a first speed-third speed-reverse drive gear 20 and a fifth speed drive gear 21, the first speed-third speed-reverse drive gear 20 and the fifth speed drive gear 21 being capable of being selectively joined to the first input shaft 12 via a third speed-fifth speed synchronizing device 22. Relatively rotatably supported on the second input shaft 14 are a second speed drive gear 23 and a fourth speed drive gear 24, the second speed drive gear 23 and the fourth speed drive gear 24 being capable of being selectively joined to the second input shaft 14 via a second speed-fourth speed synchronizing device 25.

Fixedly provided on the output shaft 15 are a first speed-second speed-third speed driven gear 26 and a fourth speed-fifth speed driven gear 27, the first speed-second speed-third speed driven gear 26 meshing with the first speed-third speed-reverse drive gear 20 and the second speed drive gear 23, and the fourth speed-fifth speed driven gear 27 meshing with the fourth speed drive gear 24 and the fifth speed drive gear 21.

Fixedly provided on the idle shaft 16 is a reverse drive gear 28, and relatively rotatably supported on the idle shaft 16 is a reverse idle gear 29. The reverse drive gear 28 meshes with the idle gear 19. The reverse idle gear 29 meshes with a reverse driven gear 31 fixedly provided on the first input shaft 12 and is capable of being joined to the idle shaft 16 through a reverse dog clutch 30.

A planetary gear mechanism 32 provided on a shaft end of the first input shaft 12 includes a sun gear 33, a ring gear 34, a carrier 35, and a plurality of pinions 36; the sun gear 33 is joined to the first input shaft 12, the carrier 35 is joined to the first speed-third speed-reverse drive gear 20, and the ring gear 34 is capable of being joined to a housing 38 via a first speed dog clutch 37.

Provided on the transmission M is a motor/generator MG that includes a stator 39 and a rotor 40, the rotor 40 being joined to the first input shaft 12.

A final drive gear 41 fixedly provided on the output shaft 15 meshes with a final driven gear 43 of a differential gear 42. The differential gear 42 is connected to left and right driven wheels W and W via drive shafts 44 and 44.

The first input shaft gear 17, the idle gear 19, the reverse drive gear 28, the idle shaft 16, the reverse dog clutch 30, the reverse idle gear 29, and the reverse driven gear 31 form reversing means 45 for reversing rotation of the crankshaft of the engine E, that is, rotation of the outer shaft 13, and transmitting it to the first input shaft 12.

Establishment of first speed gear position to fifth speed gear position and reverse gear position of the transmission M having the above arrangement is now explained.

Figure 2:
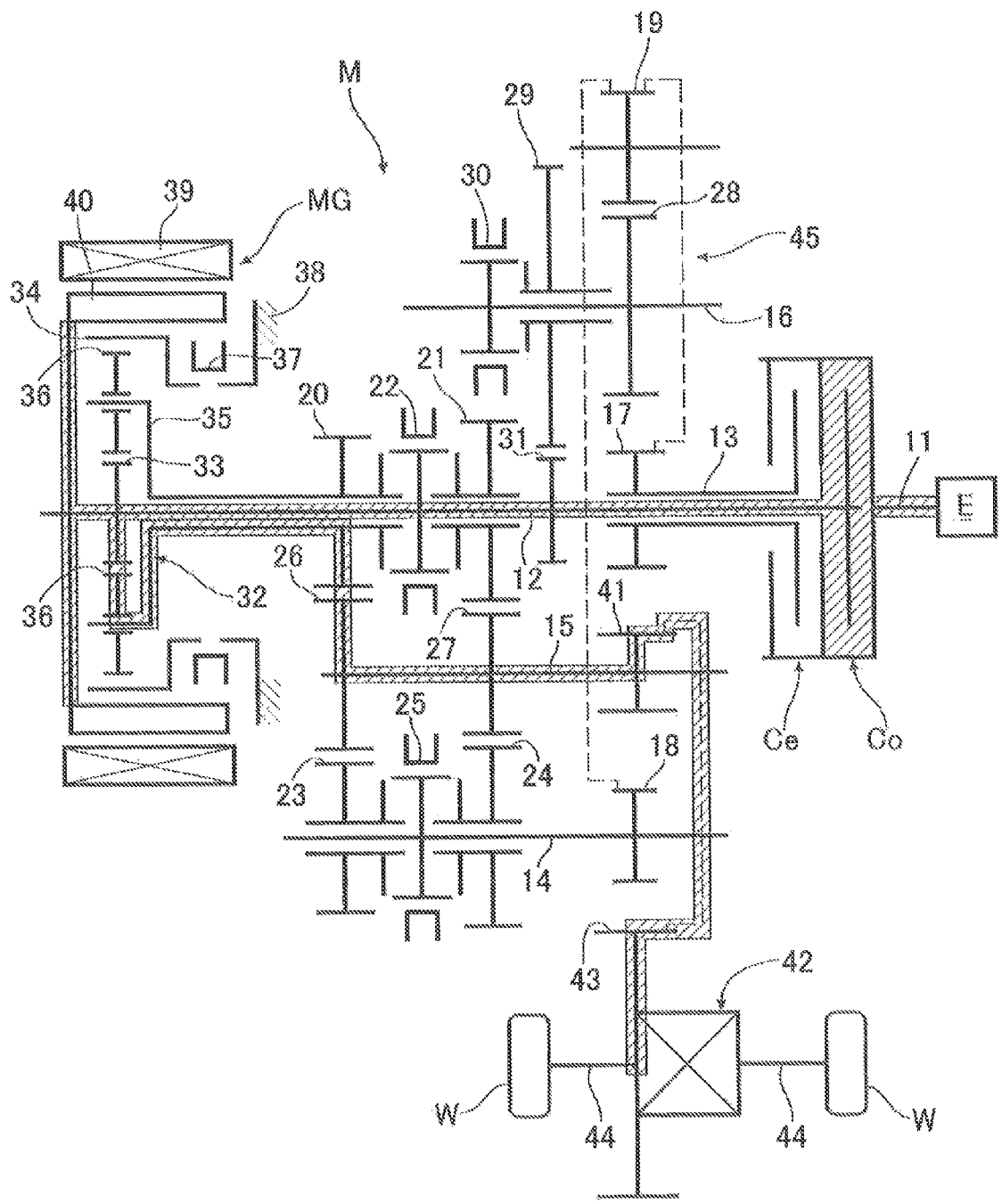
FIG. 2 is a torque flow diagram of a first speed gear position. (first embodiment)

As is clear from the torque flow diagram of FIG. 2 and the engagement table of FIG. 6, when establishing the first speed gear position, in a state in which the ring gear 34 of the planetary gear mechanism 32 is joined to the housing 38 through the first speed dog clutch 37, the odd-numbered position clutch Co is engaged so as to join the drive shaft 11 to the first input shaft 12. In this state, the driving force of the engine E is transmitted to the driven wheels W and W via the path: drive shaft 11→odd-numbered position clutch Co→first input shaft 12→sun gear 33→pinion 36→carrier 35→first speed-third speed-reverse drive gear 20→first speed-second speed-third speed driven gear 26→output shaft 15→final drive gear 41→final driven gear 43→differential gear 42→drive shafts 44 and 44.

As shown in FIG. 6, when establishing the third speed gear position or the fifth speed gear position, in a state in which the first speed-third speed-reverse drive gear 20 or the fifth speed drive gear 21 is joined to the first input shaft 12 by means of the third speed-fifth speed synchronizing device 22, the odd-numbered position clutch Co may be engaged so as to join the drive shaft 11 to the first input shaft 12. The path via which rotation of the first input shaft 12 is transmitted to the output shaft 15 when establishing the above odd-numbered gear position (first speed gear position, third speed gear position, or fifth speed gear position) is called a first power transmission path.

The outer shaft 13 is always connected to the second input shaft 14 via the first input shaft gear 17, the idle gear 19, and the second input shaft gear 18. Therefore, as shown in FIG. 6, when establishing the second speed gear position or the fourth speed gear position, in a state in which the second speed drive gear 23 or the fourth speed drive gear 24 is joined to the second input shaft 14 by means of the second speed-fourth speed synchronizing device 25, the even-numbered position clutch Ce may be engaged so as to join the drive shaft 11 to the outer shaft 13. The path via which rotation of the second input shaft 14 is transmitted to the output shaft 15 when establishing the above even-numbered gear position (second speed gear position and fourth speed gear position) is called a second power transmission path.

Figure 3:
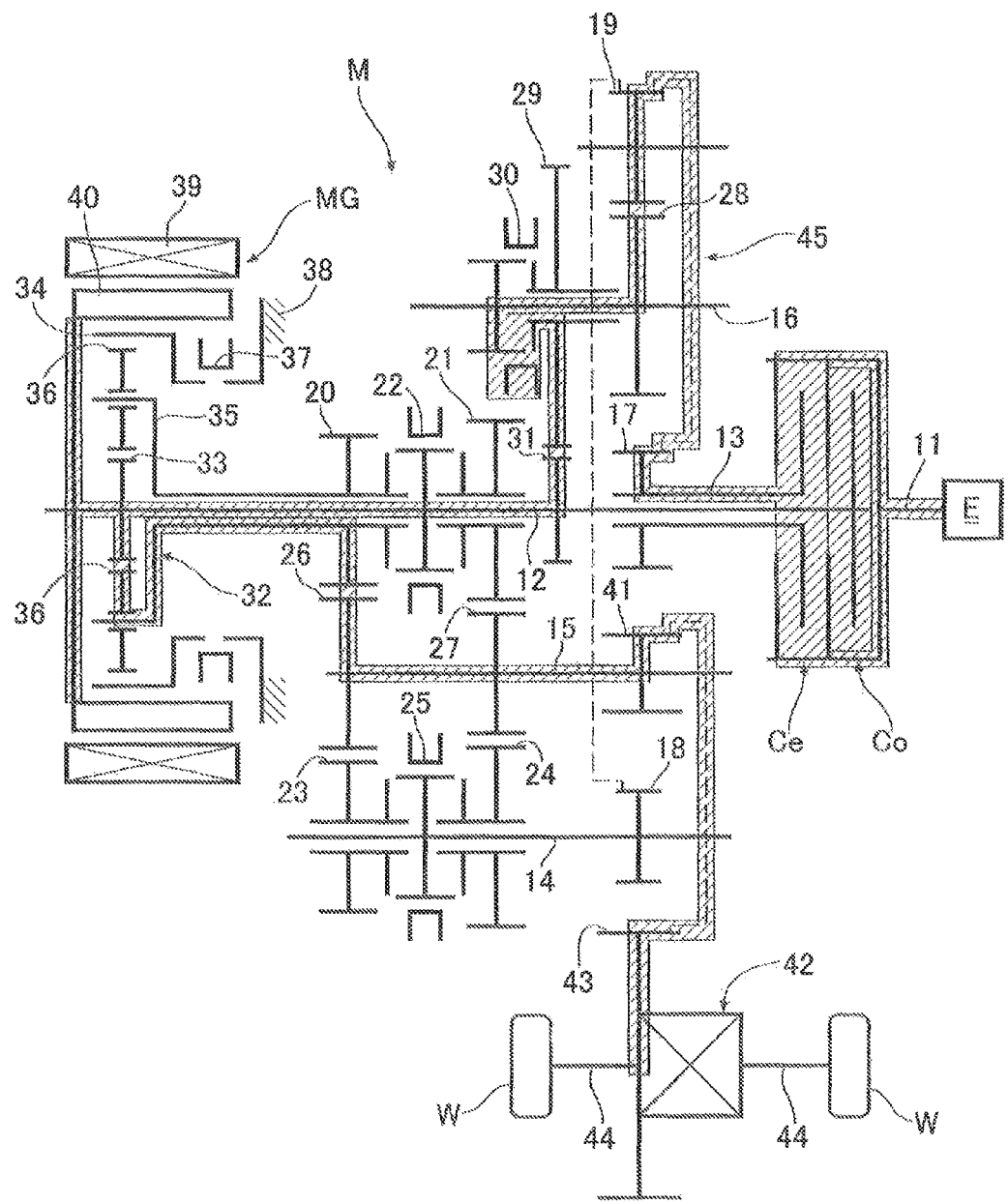
FIG. 3 is a torque flow diagram of a reverse gear position. (first embodiment)

As is clear from the torque flow of FIG. 3 and the engagement table of FIG. 6, when establishing the reverse gear position, in a state in which the reverse idle gear 29 is joined to the idle shaft 16 through the reverse dog clutch 30 and the ring gear 34 of the planetary gear mechanism 32 is joined to the housing 38 through the first speed dog clutch 37, the even-numbered position clutch Ce is engaged so as to join the drive shaft 11 to the outer shaft 13. In this state, the driving force of the engine E is reversed in rotation and transmitted to the driven wheels W and W via the path: drive shaft 11→even-numbered position clutch Ce→outer shaft 13→reversing means 45→first input shaft 12→sun gear 33→pinion 36→carrier 35→first speed-third speed-reverse drive gear 20→first speed-second speed-third speed driven gear 26→output shaft 15→final drive gear 41→final driven gear 43→differential gear 42→drive shafts 44 and 44.

The path via which rotation of the drive shaft 11 is reversed and transmitted to the output shaft 15 when establishing the above reverse gear position is called a third power transmission path. That is, the third power transmission path corresponds to addition of the first power transmission path to a power transmission path going through the reversing means 45.

When the driving force is transmitted to the driven wheels W and W via the first input shaft 12, that is, when establishing the first speed gear position, the third speed gear position, the fifth speed gear position, and the reverse gear position, driving the motor/generator MG enables the driving force of the engine E to be assisted, whereas when establishing the first speed gear position, the third speed gear position, the fifth speed gear position, and the reverse gear position, the motor/generator MG, to which the driving force of the engine E is transmitted via the first input shaft 12, can be made to function as a generator, and power generated thereby can be used for charging, for example, a 12V battery mounted on the vehicle. It is also possible to recover kinetic energy of the vehicle body as electrical energy by subjecting the motor/generator MG to regenerative braking.

Even when the shift range is a non-travel range such as the parking range (P range) or the neutral range (N range), if the motor/generator MG is driven by means of the driving force of the engine E and is made to function as a generator, a 12V battery can be charged with the power generated thereby. That is, as is clear from FIG. 4 and FIG. 6, if only the odd-numbered position clutch Co is engaged, since the driving force of the engine E is transmitted directly to the motor/generator MG via the first input shaft 12, it is possible to drive the motor/generator MG alone to generate power without transmitting the driving force to the driven wheels W and W. This power generation mode is called a first power generation mode.

Figure 4:
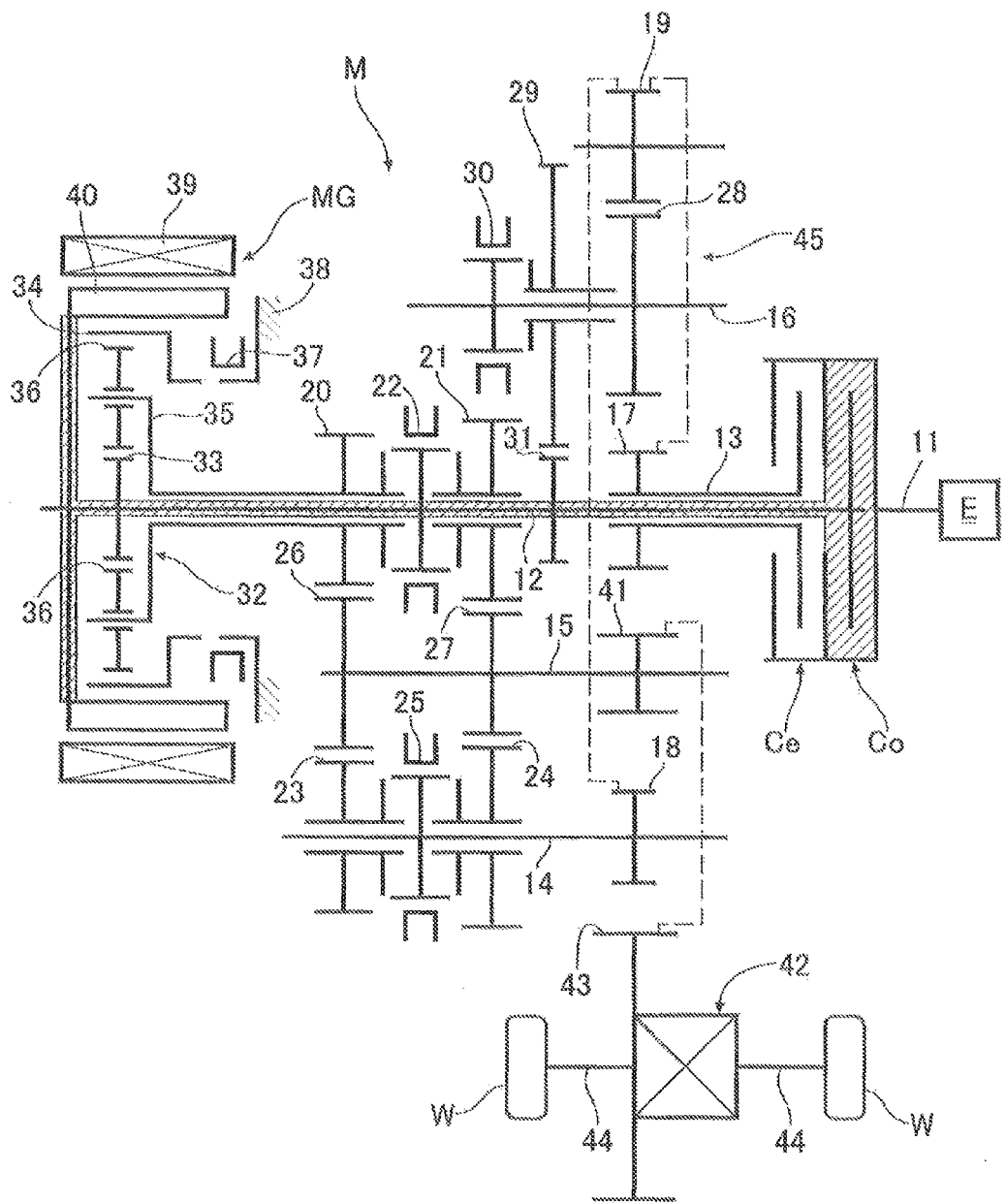
FIG. 4 is a torque flow diagram of a first power generation mode. (first embodiment)
Figure 5:
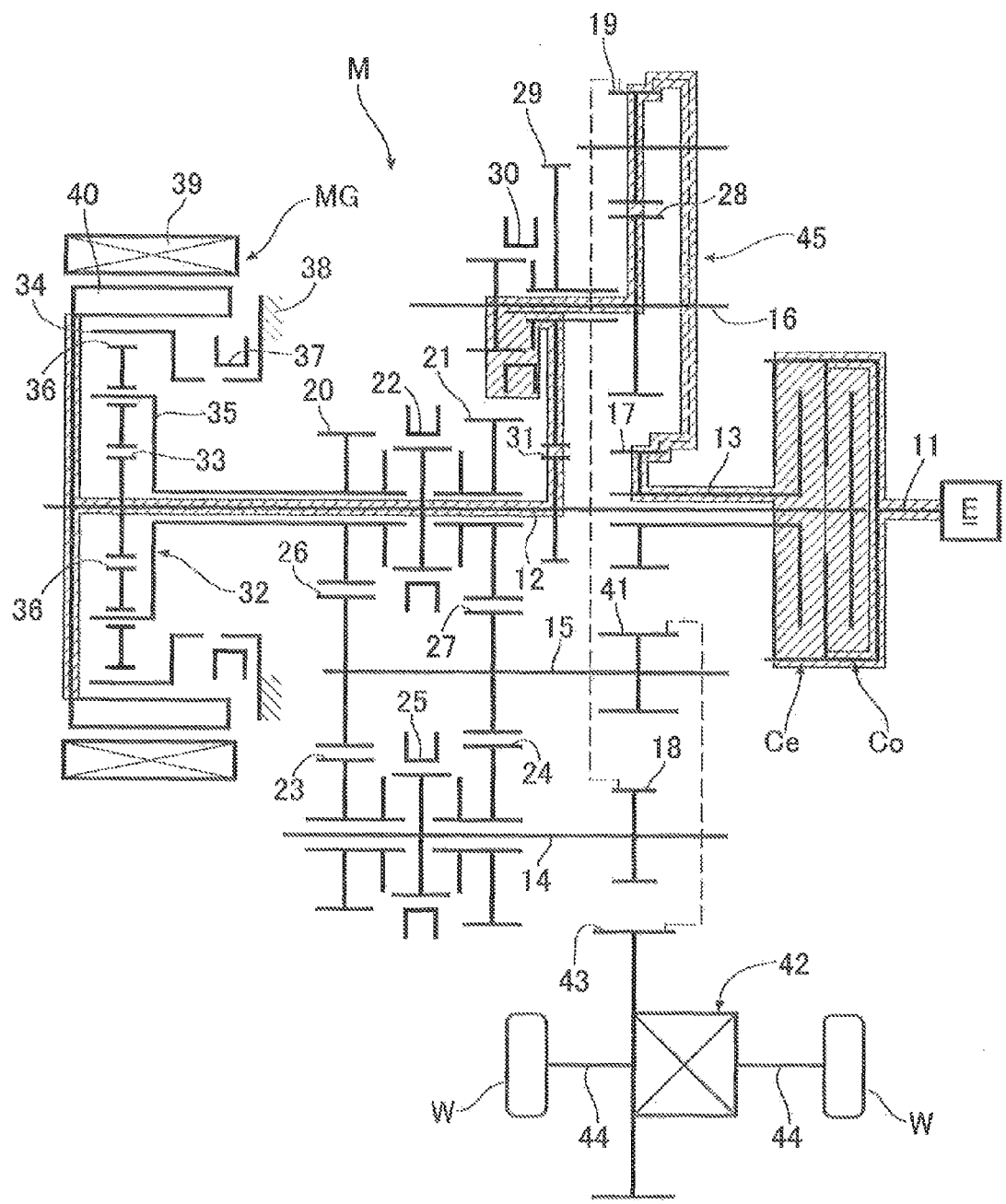
FIG. 5 is a torque flow diagram of a second power generation mode. (first embodiment)

Furthermore, as is clear from FIG. 5 and FIG. 6, when, in a state in which the reverse dog clutch 30 is engaged and the even-numbered position gear is pre-shifted to Reverse, the even-numbered position clutch Ce is engaged, the driving force of the engine E is transmitted to the motor/generator MG via the path: drive shaft 11→even-numbered position clutch Ce→outer shaft 13→reversing means 45→first input shaft 12, and it is therefore possible to drive the motor/generator MG alone to generate power without transmitting the driving force to the driven wheels W and W. This power generation mode is called a second power generation mode. In this process, since rotation of the crankshaft of the engine E goes through the reversing means 45, the rotational direction of the motor/generator MG is opposite to that of the first power generation mode of FIG. 4, but since the motor/generator MG can generate power regardless of the rotational direction, there is no problem.

In this way, when the vehicle stops in a non-travel range, if the odd-numbered position clutch Co is engaged, the motor/generator MG can be driven in the first power generation mode and power can be generated, and if the even-numbered position clutch Ce is engaged in a state in which the even-numbered position gear is pre-shifted to Reverse in advance, the motor/generator MG can be driven in the second power generation mode and power can be generated. This enables a 12V battery to be charged with power generated by the motor/generator MG regardless of the status of the even-numbered position clutch Ce or the odd-numbered position clutch Co.

For example, when the odd-numbered position clutch Co fails and cannot be engaged, the second speed gear position, the fourth speed gear position, and the reverse gear position are established using the even-numbered position clutch Ce, which can be engaged, and the vehicle can limp home to a repair shop. In this case, even if an attempt is made to drive the motor/generator MG and generate power when the vehicle stops, due to failure of the odd-numbered position clutch Co power cannot be generated in the first power generation mode, but it is possible to generate power in the second power generation mode by engaging the even-numbered position clutch Ce, which can be engaged, thus charging a 12V battery without problems.

Pre-shifting of the even-numbered position gear to Reverse, which is carried out in the P range and the N range, is now explained.

Figure 7:
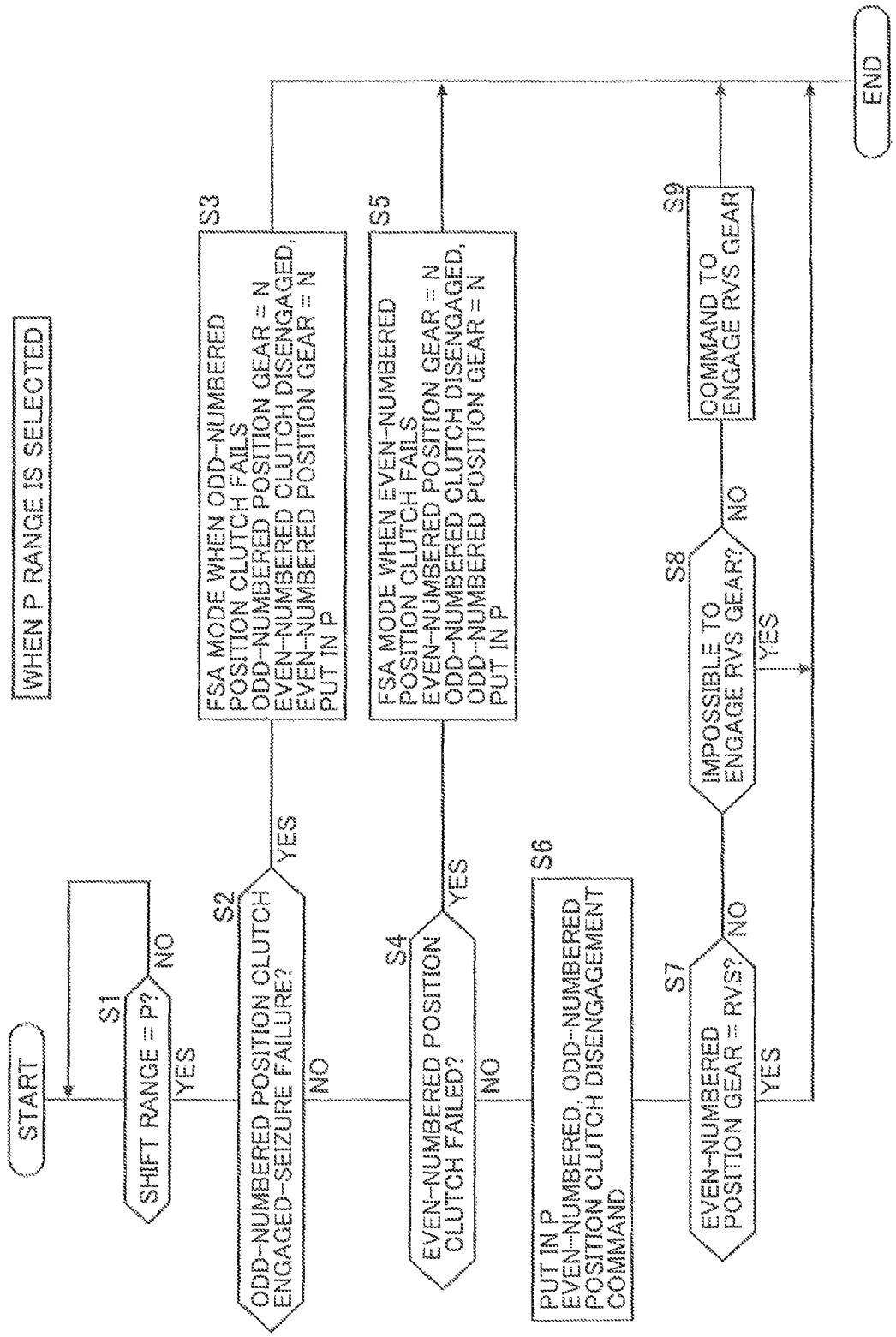
FIG. 7 is a diagram for explaining the operation of engaging reverse gear when a P range is selected. (first embodiment)

FIG. 7 is a flowchart for explaining the operation when shifting to the P range; first, in step S1 shifting to the P range is carried out, and then in step S2 it is determined whether or not the odd-numbered position clutch Co has suffered from engaged-seizure failure. If in step S2 above the odd-numbered position clutch Co has suffered from engaged-seizure failure, then in step S3 a fail-safe mode at the time of failure of the odd-numbered position clutch Co is activated, the odd-numbered position gear is put into Neutral (the first speed dog clutch 37 being disengaged and the third speed-fifth speed synchronizing device 22 being disengaged), and as well as the even-numbered position clutch Ce being disengaged the even-numbered position gear is put into Neutral (the second speed-fourth speed synchronizing device 25 being disengaged and the reverse dog clutch 30 being disengaged) and, moreover, parking lock is actuated, thus completing the present routine.

If in step S2 above the odd-numbered position clutch Co has not suffered from engaged-seizure failure, that is, the odd-numbered position clutch Co is normal or has failed while disengaged, then in step S4 it is determined whether or not the even-numbered position clutch Ce has failed. If in step S4 the even-numbered position clutch Ce has failed, then in step S5 a fail-safe mode at the time of failure of the even-numbered position clutch Ce is activated, the even-numbered position gear is put into Neutral (the second speed-fourth speed synchronizing device 25 being disengaged and the reverse dog clutch 30 being disengaged), and as well as the odd-numbered position clutch Co being disengaged the odd-numbered position gear is put into Neutral (the first speed dog clutch 37 being disengaged and the third speed-fifth speed synchronizing device 22 being disengaged) and, moreover, parking lock is actuated, thus completing the present routine.

If in step S4 above the even-numbered position clutch Ce has not failed, that is, both the odd-numbered position clutch Co and the even-numbered position clutch Ce are normal or only the odd-numbered position clutch Co has failed while disengaged, then in step S6 parking lock is actuated, and both the even-numbered position clutch Ce and the odd-numbered position clutch Co are disengaged.

If in the following step S7 the even-numbered position gear is not yet in Reverse, that is, the reverse dog clutch 30 is not yet engaged, then in step S8 it is determined whether or not the reverse dog clutch 30 cannot be engaged. That is, unless in a state in which both the even-numbered position clutch Ce and the odd-numbered position clutch Co are disengaged, due to the difference in rotational speed between the input side and the output side it becomes impossible to engage the reverse dog clutch 30, if either the even-numbered position clutch Ce or the odd-numbered position clutch Co is still engaged, engagement of the reverse dog clutch 30 is abandoned, and the present routine is completed.

If in step S8 above the reverse dog clutch 30 can be engaged, then in step S9 a command to engage the reverse dog clutch 30 is given, and as a result if in step S7 above the even-numbered position gear is in Reverse, the present routine is completed.

As hereinbefore described, when shifting to the P range has been carried out, actuation of parking lock is prioritized; subsequently, provided that the odd-numbered position clutch Co and the even-numbered position clutch Ce are normal, the even-numbered position gear is pre-shifted to Reverse, and after that when the odd-numbered position clutch Co fails and it becomes impossible for it to be engaged, the even-numbered position clutch Ce is engaged. This enables transition to the second power generation mode and the motor/generator MG to be driven, thereby charging a 12V battery (see FIG. 5 and FIG. 6).

In addition, even when the odd-numbered position clutch Co is seized while disengaged, the even-numbered position gear is pre-shifted to Reverse, the reason therefor being that since the odd-numbered position clutch Co is not engaged when establishing the second power generation mode, even if it were seized while disengaged, there would be no problem.

Figure 8:
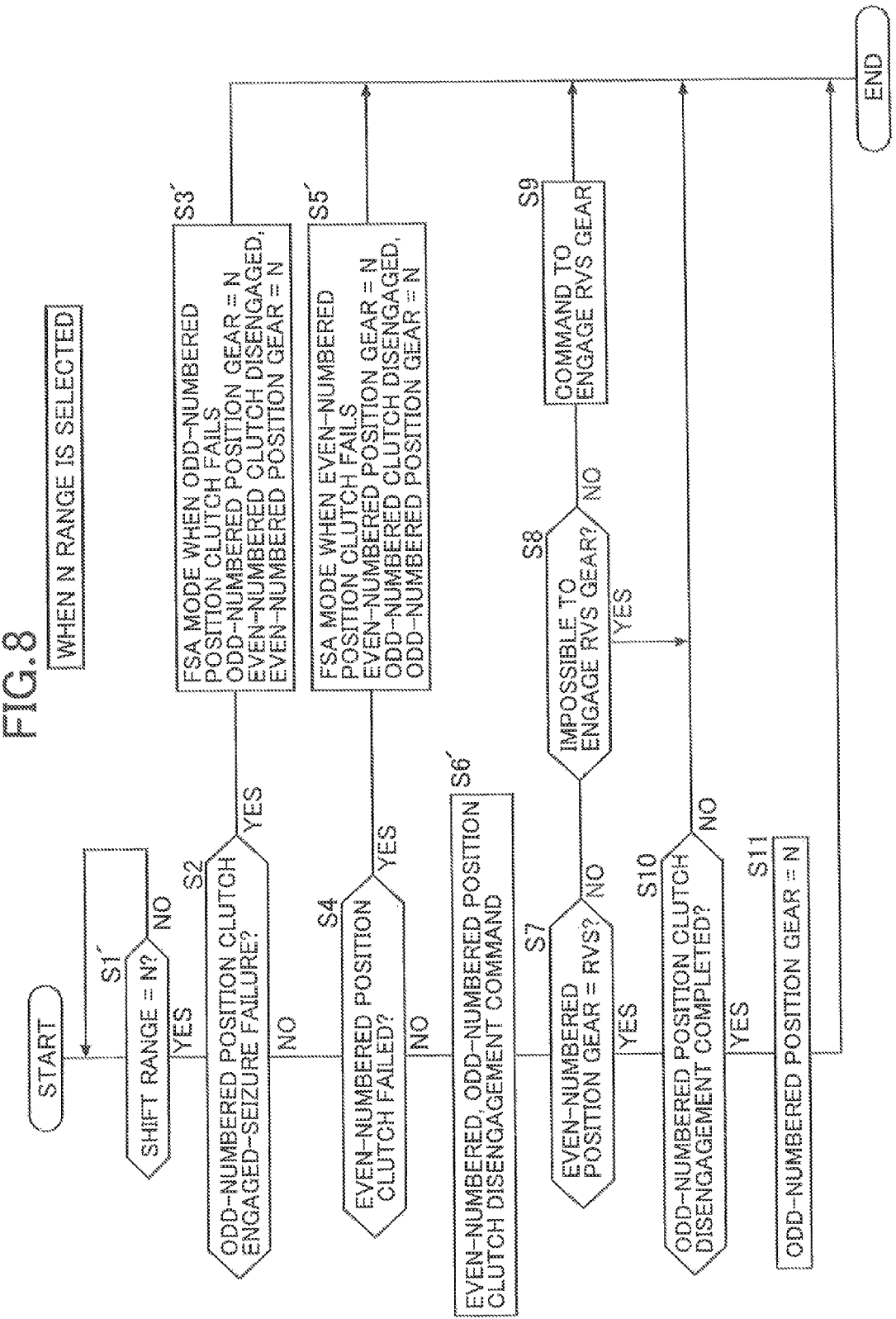
FIG. 8 is a diagram for explaining the operation of engaging reverse gear when an N range is selected. (first embodiment)

FIG. 8 is a flowchart for explaining the operation when shifting to the N range; the contents of the steps having the same numerals as those of the flowchart of FIG. 7 are the same as the flowchart of FIG. 7. Therefore, it is mainly differences from the flowchart of FIG. 7 that are explained.

In step S1 of the flowchart of FIG. 7 it is determined whether or not there is a shift to the P range, but in step S1' of the flowchart of FIG. 8 it is determined whether or not there is a shift to the N range.

In steps S3, S5, and S6 of the flowchart of FIG. 7 parking lock is actuated, but in steps S3', S5', and S6' of the flowchart of FIG. 8 parking lock is not actuated.

When in step S7 of the flowchart of FIG. 8 the even-numbered position gear is put in Reverse, if in step S10 disengagement of the odd-numbered position clutch Co is completed, then in step S11 the odd-numbered position gear is put in Neutral (the first speed dog clutch 37 being disengaged and the third speed-fifth speed synchronizing device 22 being disengaged), thus completing the present routine.

As hereinbefore described, when there is a shift to the N range, after the odd-numbered position clutch Co and the even-numbered position clutch Ce are disengaged, movement of the even-numbered position gear to Reverse is prioritized rather than movement of the odd-numbered position gear to Neutral. When the even-numbered position gear is pre-shifted to Reverse and the odd-numbered position clutch Co then fails and it becomes impossible for it to be engaged, engaging the even-numbered position clutch Ce so as to transition to the second power generation mode is the same as when there is a shift to the P range.

The operation when power is generated in the second power generation mode with the P range (or the N range) is now explained by reference to the time chart of FIG. 9.

When the shift range is the P range (or the N range), by engaging the odd-numbered position clutch Co, usually in a state in which the odd-numbered position gear is put in Neutral and the even-numbered position gear is pre-shifted to Reverse, power generation is carried out in first power generation mode (see FIG. 4). If at time t1 it is detected that the odd-numbered position clutch Co has seized and failed in a disengaged state, a command to engage the even-numbered position clutch Ce is outputted, and when at time t2 engagement of the even-numbered position clutch Ce is completed, generation of power in the second power generation mode is started. In the second power generation mode, rotation of the engine E is transmitted in reverse to the motor/generator MG via the reversing means 45, but the motor/generator MG can generate power regardless of the rotational direction, and there is thus no problem.

Figure 9:
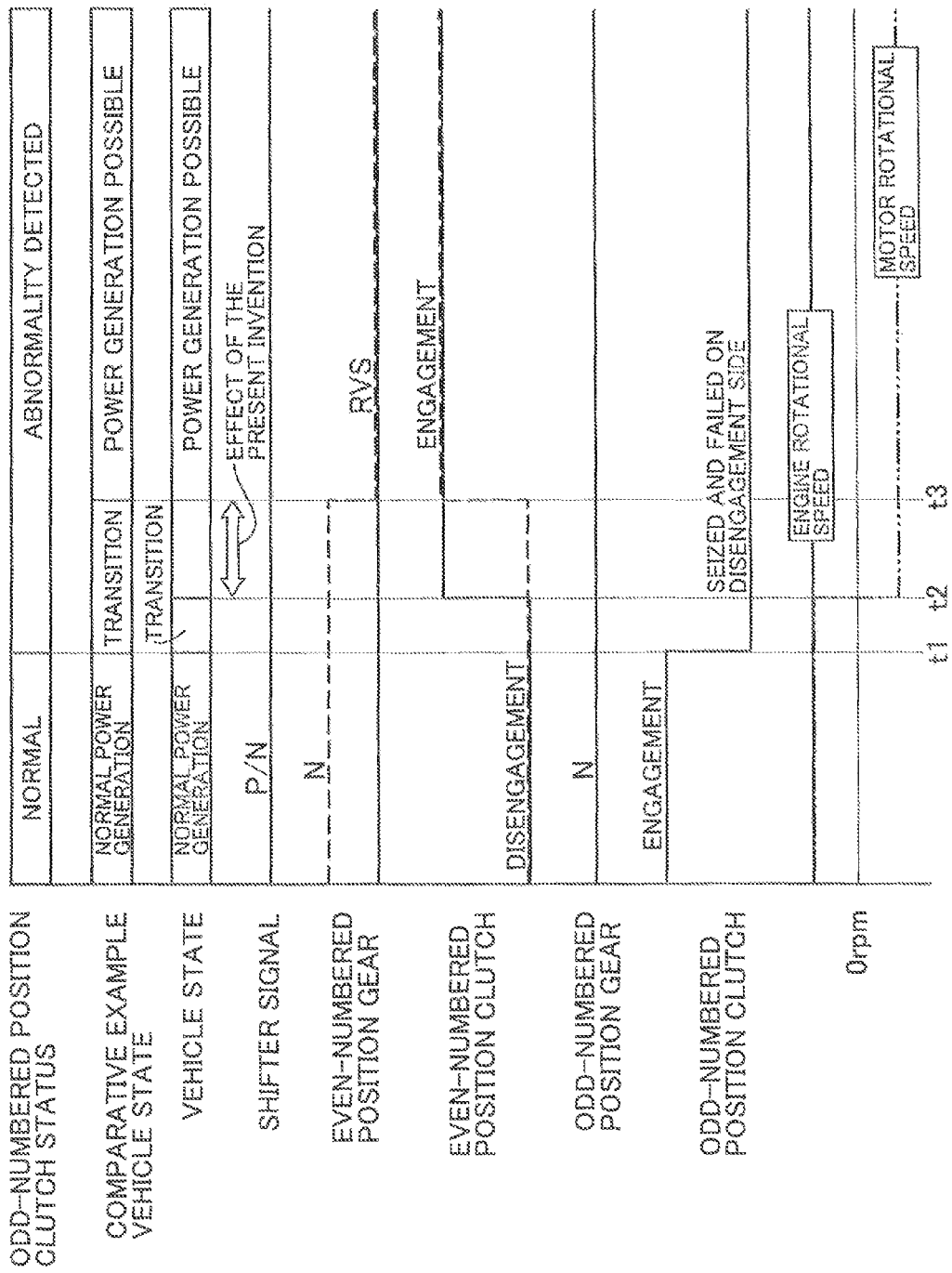
FIG. 9 is a time chart for explaining power generation starting responsiveness when an odd-numbered position clutch fails. (first embodiment)

The broken line of FIG. 9 shows a Comparative Example; in the Comparative Example, even when there is a shift to a P range (or an N range), an even-numbered position gear is not pre-shifted to Reverse, and at time t1 when it is detected that an odd-numbered position clutch Co has seized and failed in a disengaged state, shifting of the even-numbered position gear to Reverse is started, and at time t3 shifting to Reverse is completed. Even if a command to engage an even-numbered position clutch Ce is outputted in anticipation of the time required for engagement of the even-numbered position clutch Ce to be completed at time t3, a second power generation mode in which the driving force of an engine E is transmitted to a motor/generator MG and generation of power is executed is established at time t3, which is later than the time t2 of the embodiment, and the start of generation of power is delayed accordingly.

As hereinbefore described, in the present embodiment, since the even-numbered position gear is pre-shifted to Reverse if there is a transition to the P range (or the N range), when the odd-numbered position clutch Co is seized and fails in a disengaged state and generation of power in the first power generation mode becomes impossible, merely engaging the even-numbered position clutch Ce enables immediate transition to the second power generation mode, thus minimizing the transition period, during which generation of power is impossible.

Furthermore, in accordance with the present embodiment, pre-shifting the even-numbered position gear to Reverse in the P range and the N range enables a further operational effect in enhancing the responsiveness of starting to move in reverse to be achieved. The reason therefor is explained below.

Figure 10:
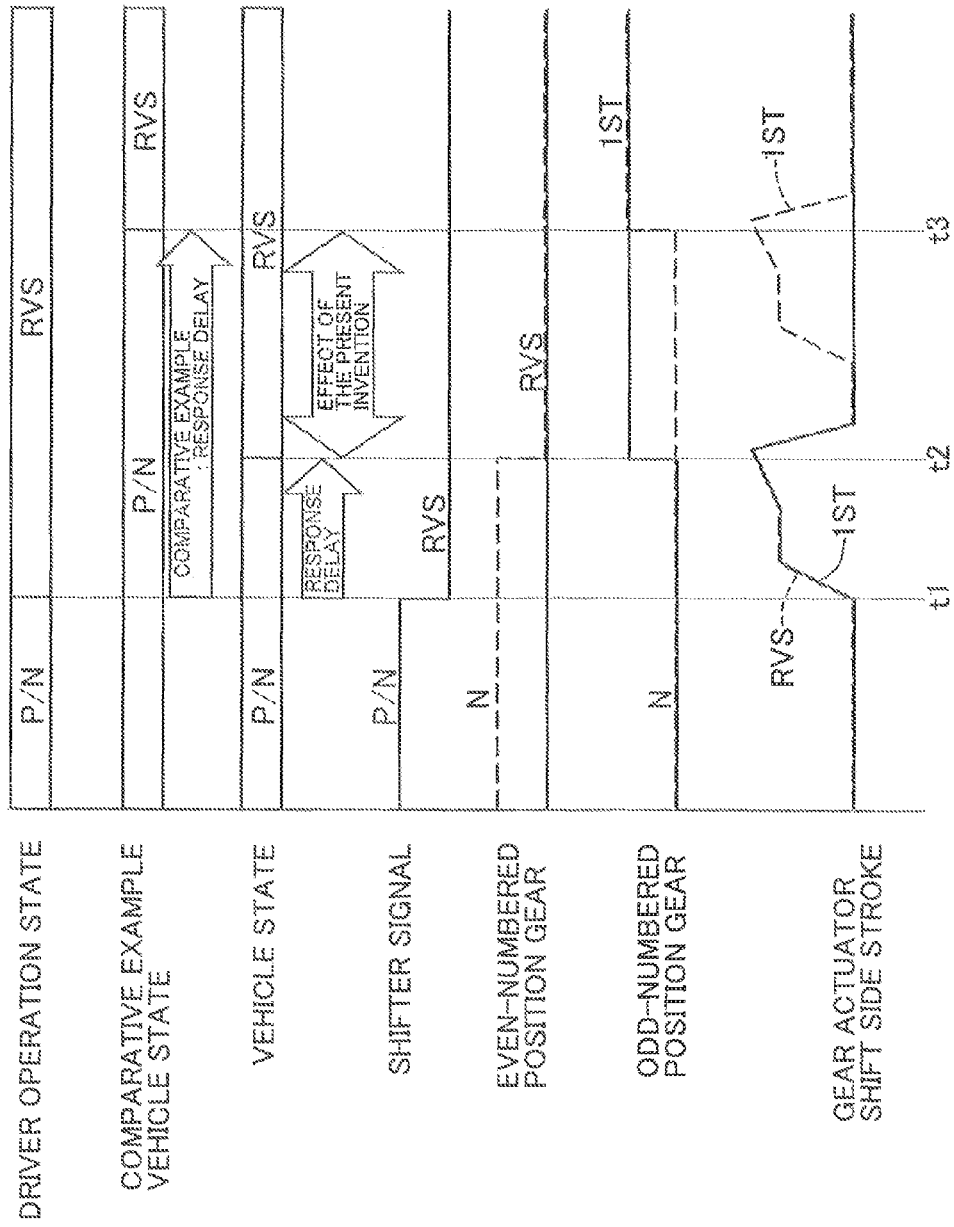
FIG. 10 is a time chart for explaining shift responsiveness when carrying out P/N range→R range switching. (first embodiment)

As shown in FIG. 10, since the even-numbered position gear is pre-shifted to Reverse if there is a shift to the P range (or the N range), when at time t1 in order to start moving in reverse the vehicle the shift range is switched from the P range to the reverse range (R range), at time t2 the first speed dog clutch 37 is actuated so as to shift the odd-numbered position gear to the first speed, and the reverse gear position is thus established, thereby enabling the vehicle to start moving in reverse.

On the other hand, the broken line shows a Comparative Example; in the Comparative Example even if there is a shift to a P range (or an N range) an even-numbered position gear is not pre-shifted to Reverse; at time t1 in order to start moving the vehicle in reverse the shift range is switched from the P range (or the N range) to an R range, after that, at time t2 a reverse dog clutch 30 is first actuated so as to shift the even-numbered position gear to Reverse and, furthermore, at time t3 a first speed dog clutch 37 is actuated so as to shift an odd-numbered position gear to first speed, and as a result at time t3 a reverse gear position is established and starting to move in reverse becomes possible; starting to move in reverse is delayed by the portion of time corresponding to that while the even-numbered position gear is shifted to Reverse. The reason why the reverse dog clutch 30 and the first speed dog clutch 37 are actuated with a time difference is because it is necessary to carry out selection between shifting of the reverse dog clutch 30 and shifting of the first speed dog clutch 37.

As hereinbefore described, in the present embodiment, since the even-numbered position gear is pre-shifted to Reverse if there is a transition to the P range (or the N range), when there is a transition to the R range, merely shifting the odd-numbered position gear to first speed without shifting the even-numbered position gear to Reverse enables the reverse gear position to be established, thereby enhancing the responsiveness of starting to move in reverse.

A mode for carrying out the present invention is explained above, but the present invention may be modified in a variety of ways as long as the modifications do not depart from the spirit and scope thereof.

For example, generation of power in the second power generation mode is not limited to a case in which the odd-numbered position clutch Co fails, and it may be a case in which engagement of the odd-numbered position clutch Co is temporarily suspended for cooling or refueling.

Furthermore, the transmission M of the embodiment has five forward speeds, but the number of gear positions may be freely selected.

Moreover, the odd-numbered position clutch Co and the even-numbered position clutch Ce are not limited to dry single plate clutches and may be dry multi-plate clutches or wet clutches.

The invention claimed is:
1. A hybrid vehicle comprising
an engine,
a first input shaft to which a driving force of the engine is transmitted via a first clutch,
a motor/generator that is connected to the first input shaft,
a second input shaft that is disposed in parallel to the first input shaft and to which the driving force of the engine is transmitted via a second clutch,
an output shaft that is disposed in parallel to the first input shaft,
a first power transmission path that transmits rotation of the first input shaft to the output shaft via a first gear group and a first engagement element,
a second power transmission path that transmits rotation of the second input shaft to the output shaft via a second gear group and a second engagement element,
reversing means that reverses rotation of the engine transmitted thereto via the second clutch and transmits the reversed rotation of the engine to the first input shaft via a reverse engagement element,
a third power transmission path that transmits rotation of the engine to the output shaft via the reversing means and the first power transmission path,
the hybrid vehicle establishing a forward gear position in a drive range through the first engagement element of the first power transmission path or the second engagement element of the second power transmission path and establishing a reverse gear position in a reverse range through the reverse engagement element of the third power transmission path and the first engagement element, wherein
in a neutral range or a parking range the hybrid vehicle has a first power generation mode in which the first clutch is engaged so as to transmit the driving force of the engine to the motor/generator and generate power and a second power generation mode in which the second clutch is engaged so as to transmit the driving force of the engine to the motor/generator via the reversing means and generate power, and the hybrid vehicle selects one of the first and second power generation modes depending on operable availability of the modes, and the reverse engagement element is engaged in the neutral range or the parking range.

2. The hybrid vehicle according to claim 1, wherein when in the neutral range or the parking range, and when the first clutch fails, the hybrid vehicle selects power to be generated in the second power generation mode.

* * * * *